US011098447B2

(12) United States Patent
Konishi et al.

(10) Patent No.: US 11,098,447 B2
(45) Date of Patent: *Aug. 24, 2021

(54) METHOD FOR MANUFACTURING RECYCLED PULP FROM USED SANITARY PRODUCTS

(71) Applicant: UNICHARM CORPORATION, Ehime (JP)

(72) Inventors: Takayoshi Konishi, Kanonji (JP); Toshio Hiraoka, Kanonji (JP)

(73) Assignee: UNICHARM CORPORATION, Ehime (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/818,166

(22) Filed: Mar. 13, 2020

(65) Prior Publication Data

US 2020/0217013 A1 Jul. 9, 2020

Related U.S. Application Data

(62) Division of application No. 15/317,410, filed as application No. PCT/JP2015/056959 on Mar. 10, 2015, now Pat. No. 10,626,554.

(30) Foreign Application Priority Data

Jun. 12, 2014 (JP) .............................. JP2014-121822

(51) Int. Cl.
| | |
|---|---|
| *D21C 5/02* | (2006.01) |
| *D21B 1/32* | (2006.01) |
| *D21C 9/153* | (2006.01) |
| *D21H 11/14* | (2006.01) |
| *B09B 3/00* | (2006.01) |

(52) U.S. Cl.
CPC ................ *D21C 5/022* (2013.01); *B09B 3/00* (2013.01); *B09B 3/0075* (2013.01); *D21B 1/32* (2013.01); *D21C 5/02* (2013.01); *D21C 9/153* (2013.01); *D21H 11/14* (2013.01)

(58) Field of Classification Search
CPC ............. D21C 5/02; D21B 1/32; D21H 11/14
USPC .......................................................... 162/4
See application file for complete search history.

(56) References Cited

U.S. PATENT DOCUMENTS

| | | | |
|---|---|---|---|
| 5,089,258 A * | 2/1992 | Zaid | ...................... A61K 8/365 |
| | | | 424/489 |
| 5,336,372 A | 8/1994 | Cody et al. | |
| 6,562,743 B1 | 5/2003 | Cook et al. | |
| 2003/0006017 A1 | 1/2003 | Sundaram et al. | |
| 2007/0137805 A1 | 6/2007 | Gerber et al. | |
| 2011/0165639 A1* | 7/2011 | Ascon | ....................... C12P 7/04 |
| | | | 435/134 |
| 2015/0265737 A1 | 9/2015 | Yamaguchi et al. | |
| 2015/0291762 A1 | 10/2015 | Watanabe et al. | |
| 2015/0307681 A1 | 10/2015 | Park et al. | |
| 2016/0237617 A1 | 8/2016 | Yamaguchi et al. | |
| 2017/0107667 A1 | 4/2017 | Konishi et al. | |

FOREIGN PATENT DOCUMENTS

| | | |
|---|---|---|
| EP | 3064644 A1 | 9/2016 |
| JP | 6-184970 A | 7/1994 |
| JP | 2001-310178 A | 11/2001 |
| JP | 2005-47622 A | 2/2005 |
| JP | 2009-183893 A | 8/2009 |
| JP | 2010-59586 A | 3/2010 |
| JP | 2013-150976 A | 8/2013 |
| JP | 2014-79666 A | 5/2014 |
| JP | 2014-217835 A | 11/2014 |
| JP | 2015-86483 A | 5/2015 |
| JP | 2016-881 A | 1/2016 |
| SE | 517145 C2 | 4/2002 |
| WO | 92/07995 A1 | 5/1992 |
| WO | 2014/007105 A1 | 1/2014 |
| WO | 2014/041251 A1 | 3/2014 |
| WO | 2015/064209 A1 | 5/2015 |

OTHER PUBLICATIONS

Diaper answers.org, Diapers and Solid Waste Disposal [downloaded online from diaperanswers.org], 2017 [downloaded on Aug. 20, 2020]. (Year: 2017).*

Jacobs, Landfills Being recycled as Recreation Centers, Jun. 20, 2000 [downloaded online Aug. 20, 2020], Los Angeles Times. (Year: 2000).*

Malester et al., Kinetics of Dilute Acid Hydrolysis of Cellulose Originating from Municipal Solid Waste, 1992, Ind. Eng. Res., vol. 31, No. 8, p. 1998-2003. (Year: 1992).*

Saeman et al., Quantitative Saccharification of Wood and Cellulose, Jan. 1945, Industrial and Engineering Chemistry, vol. 17, No. 1, p. 35-37. (Year: 1945).*

(Continued)

*Primary Examiner* — Anthony Calandra
(74) *Attorney, Agent, or Firm* — Hauptman Ham, LLP

(57) ABSTRACT

A recycled pulp that is reusable sanitary products is efficiently manufactured by recovering pulp fiber from used sanitary products containing the pulp fiber and a polymer absorbent. The method of the present invention comprises: a step applying a mechanical force to the used sanitary products in an aqueous solution containing a polyvalent metal ion or an acidic aqueous solution with a pH of 2.5 or lower and thus degrading the used sanitary products into the pulp fiber and other materials; a step separating the pulp fiber from the mixture of the pulp fiber and other materials that has been formed in the degradation step; and a step treating the pulp fiber thus separated with an ozone-containing aqueous solution with a pH of 2.5 or lower.

14 Claims, No Drawings

(56) References Cited

OTHER PUBLICATIONS

International Search Report in International Patent Application No. PCT/JP2015/056959, dated Jun. 9, 2015.
Office Action in U.S. Appl. No. 16/785,922, dated Aug. 25, 2020, 10pp.
Xia Yuzheng et al., "Fine Polymer Chemicals and Applications", Chemical Industry Press, Sep. 30, 2000, pp. 104-106, 14pp.
Qiquan Lin et al., Pulp and Paper Engineering', China Light Industry Press, vol. 4, Nov. 1989, p. 3, 5pp.

* cited by examiner

METHOD FOR MANUFACTURING RECYCLED PULP FROM USED SANITARY PRODUCTS

RELATED APPLICATIONS

The present application is a Divisional Application of U.S. application Ser. No. 15/317,410, filed Dec. 9, 2016, which is a National Phase of International Application Number PCT/JP2015/056959, filed Mar. 10, 2015, which claims priority from Japanese Application Number 2014-121822, filed Jun. 12, 2014, the disclosures of which are hereby incorporated by reference herein in their entireties.

TECHNICAL FIELD

The present invention relates to a method for manufacturing recycled pulp from used sanitary products. More particularly, the present invention relates to a method for manufacturing recycled pup able to be recycled as sanitary products by recovering pulp fibers from disposable diapers and other used sanitary products containing pulp fibers and superabsorbent polymers.

BACKGROUND ART

Efforts have been made in the past to recycle disposable diapers and other used sanitary products. In order to recycle used sanitary products, the used sanitary product is normally degraded in water followed by separating into constituent components of the sanitary product and recovering those constituent components. However, in addition to increasing in mass as a result of absorbing water, superabsorbent polymers contained in sanitary products also lose fluidity as a result of forming a gel, thereby lowering the processing capacity of processing devices.

Therefore, Japanese Unexamined Patent Publication No. 2009-183893 (Patent Document 1) discloses that superabsorbent polymer present in a used disposable diaper that has absorbed water is dehydrated with lime (claim 2). As a result, in addition to reducing the weight of the superabsorbent polymer, since fluidity is recovered as a result of returning to its original state from a gel, decreases in processing capacity of the processing device are avoided (paragraph [0020]).

In addition, Japanese Unexamined Patent Publication No. 2010-59586 (Patent Document 2) discloses a method for recycling used diapers wherein, in recycling a used disposable diaper, the superabsorbent polymer contained in the disposable diaper can be put into the form of fine particles without using chemicals. In this recycling method, the used disposable diaper is separated into a pulp component and a non-pulp component together with breaking up the used disposable diaper, and after washing a mixture of the degraded pulp component and vinyl or other non-pulp component with water, the non-pulp component is separated and recovered from the mixture, and superabsorbent polymer present in the pulp component, from which non-pulp component has been removed and which has absorbed water and swollen, is broken up into fine particles measuring 10 µm or less by a pulverizer without breaking up the fibers of the pulp component to form a suspension containing the fine particulate superabsorbent polymer, pulp component and water, followed by dehydrating the suspension and removing the superabsorbent polymer from the pulp component together with the water to recover the pulp component (claim 1). Patent Document 2 further discloses that, in a weighing step, the used disposable diaper is sterilized and deodorized using an ultraviolet lamp and ozone (gas) or ozone water and the like (paragraph [0015]).

PRIOR ART DOCUMENTS

Patent Documents

Patent Document 1: Japanese Unexamined Patent Publication No. 2009-183893
Patent Document 2: Japanese Unexamined Patent Publication No. 2010-59586

DISCLOSURE OF THE INVENTION

Problems to be Solved by the Invention

As described in Patent Document 1, a superabsorbent polymer that has been dehydrated using lime is transformed into a solid powder having a particle size of several micrometers to several hundred micrometers, and the fine particles in particular are easily trapped between pulp fibers thereby preventing them from being completely removed by physical rinsing alone. As a result, when the recovered pulp fibers are attempted to be reused, not only does the residual superabsorbent polymer end up becoming a contaminant, but since it is in the form of a calcium salt, an amount of ash that exceeds the standard level for sanitary products is easily detected in the recovered pulp fibers. In addition, since the use of lime results in high alkalinity, ozone is easily deactivated in the case of carrying out ozone treatment.

In addition, as described in Patent Document 2, superabsorbent polymer that has been broken up into fine particles of 10 µm or less are easily trapped between pulp fibers as a result of being in the form of fine particles, thereby preventing the superabsorbent polymer from being completely removed by physical rinsing alone. As a result, when the recovered pulp fibers are attempted to be reused, the residual superabsorbent polymer ends up becoming a contaminant. In addition, since the superabsorbent polymer is pulverized with a pulverizer after having absorbed water and swollen, excessive labor, pulverizing equipment and processing energy are required, thereby resulting in poor productivity.

Means for Solving the Problems

As a result of focusing on these problems of the prior art, the inventors of the present invention found that, by degrading a used sanitary product in an aqueous solution containing a polyvalent metal ion or an acidic aqueous solution having a pH of 2.5 or lower, which are capable of inhibiting absorption of water and swelling by a superabsorbent polymer, separating into pulp fibers (containing residual superabsorbent polymer) and other materials, and subjecting the separated pulp fibers to ozone treatment in an acidic aqueous solution having a pH of 2.5 or lower, the superabsorbent polymer remaining in the separated pulp fibers can be efficiently degraded and removed by the ozone to obtain recycled pulp that can be reused as a sanitary product, thereby leading to completion of the present invention.

Namely, the present invention is a method for manufacturing recycled pulp that can be reused as a sanitary product by recovering pulp fibers from a used sanitary product containing pulp fibers and superabsorbent polymer, comprising the steps of:

degrading the used sanitary product into pulp fibers and other materials by allowing a mechanical force to act on the used sanitary product in an aqueous solution containing polyvalent metal ion or an acidic aqueous solution having a pH of 2.5 or lower, separating the pulp fibers from the mixture of pulp fibers and other materials formed in the degrading step, and treating the separated pulp fibers with an ozone-containing aqueous solution having a pH of 2.5 or lower.

The present invention further includes the aspects indicated below.

[1] A method for manufacturing recycled pulp that can be reused as a sanitary product by recovering pulp fibers from a used sanitary product containing pulp fibers and superabsorbent polymer, comprising the steps of:

degrading the used sanitary product into pulp fibers and other materials by allowing a mechanical force to act on the used sanitary product in an aqueous solution containing polyvalent metal ion or an acidic aqueous solution having a pH of 2.5 or lower, separating the pulp fibers from the mixture of pulp fibers and other materials formed in the degrading step, and treating the separated pulp fibers with an ozone-containing aqueous solution having a pH of 2.5 or lower.

[2] The method described in [1], wherein the ozone-containing aqueous solution having a pH of 2.5 or lower contains an organic acid.

[3] The method described in [2], wherein the organic acid is at least one selected from the group consisting of tartaric acid, glycolic acid, malic acid, citric acid, succinic acid and acetic acid.

[4] The method described in [3], wherein the organic acid is citric acid.

[5] The method described in any one of [1] to [4], wherein the polyvalent metal ion is an alkaline earth metal ion.

[6] The method described in [5], wherein the aqueous solution containing a polyvalent metal ion is an aqueous calcium chloride solution.

[7] The method described in any one of [1] to [6], wherein the concentration of ozone in the ozone-containing aqueous solution is 1 to 50 ppm by weight.

[8] The method described in any one of [1] to [7], wherein the pH of the aqueous solution containing polyvalent metal ion is higher than 7 and equal to or lower than 11.

[9] The method described in any one of [1] to [8], further comprising a step for dehydrating the separated pulp fibers.

[10] The method described in any one of [1] to [9], wherein the ash content of the recycled pulp is 0.65% by weight or less.

[11] A recycled pulp having an ash content of 0.11% by weight or less.

[12] A recycled pulp having an ash content of 0.11% by weight or less that is recovered from a used sanitary product containing pulp fibers and superabsorbent polymer.

[13] A recycled pulp having an ash content of 0.11% by weight or less that is obtained by a method for recovering pulp fibers from a used sanitary product containing pulp fibers and superabsorbent polymer, wherein the method comprises the steps of:

degrading the used sanitary product into pulp fibers and other materials by allowing a mechanical force to act on the used sanitary product in an aqueous solution containing polyvalent metal ion or an acidic aqueous solution having a pH of 2.5 or lower, separating the pulp fibers from the mixture of pulp fibers and other materials formed in the degrading step, and treating the separated pulp fibers with an ozone-containing aqueous solution having a pH of 2.5 or lower.

Effects of the Invention

According to the present invention, pulp having an ash content compatible with sanitary material standards can be efficiently recovered from a used sanitary product.

BEST MODE FOR CARRYING OUT THE INVENTION

The present invention relates to a method for manufacturing recycled pulp able to be reused as a sanitary product by recovering pulp fibers from a used sanitary product containing pulp fibers and superabsorbent polymer.

There are no particular limitations on the sanitary product provided it contains pulp fibers and superabsorbent polymer, and examples thereof include disposable diapers, urinary incontinence pads, urine collection pads, sanitary napkins and panty liners. Among these, urinary incontinence pads and disposable diapers that are collectively recovered at health care facilities and the like are preferable from the viewpoints of eliminating the bother associated with separation during disposal and containing a comparatively large amount of pulp.

There are no particular limitations on the pulp fibers and examples thereof include fluff pulp fibers and chemical pulp fibers.

Superabsorbent polymer (abbreviated as SAP) has a three-dimensional network structure suitably crosslinked with a water-soluble polymer, and although it is capable of absorbing several tens of times to several hundred times its weight of water, is essentially water-insoluble, does not release water once it has been absorbed even if a certain amount of pressure is applied, and examples thereof include starch-based, acrylic acid-based and amino acid-based particulate or fibrous polymers.

In this description, pulp manufactured according to the method of the present invention refers to "recycled pulp".

The method of the present invention comprises:

a step for degrading a used sanitary product into pulp fibers and other materials by allowing a mechanical force to act on the used sanitary product in an aqueous solution containing polyvalent metal ion or an acidic aqueous solution having a pH of 2.5 or lower, a step for separating the pulp fibers from the mixture of pulp fibers and other materials formed in the degradation step, and a step for treating the separated pulp fibers with an ozone-containing aqueous solution having a pH of 2.5 or lower.

The method of the present invention preferably further comprises a step for dehydrating the separated pulp fibers.

The method of the present invention comprises a step for degrading a used sanitary product into pulp fibers and other materials by allowing a mechanical force to act on the used sanitary product in an aqueous solution containing polyvalent metal ion or an acidic aqueous solution having a pH of 2.5 or lower (to be referred to as the "degradation step").

In this step, the used sanitary product is separated into pulp fibers and other materials by allowing a mechanical force to act on the used sanitary product.

Sanitary products are normally composed of various types of materials such as pulp fibers, superabsorbent polymer, non-woven fabric, plastic film and rubber. In this degradation step, the used sanitary product is degraded into each of the aforementioned materials. The degree of degradation is required to be such that at least a portion of the pulp fibers can be recovered, and the used sanitary product is not necessarily required to be completely degraded, but rather may only be partially degraded.

Here, although there are no particular limitations thereon, examples of methods used to allow a mechanical force to act on the used sanitary product include agitation, beating, poking, vibrating, tearing, cutting and pulverizing. Among these, agitation is preferable. Agitation can be carried out in a treatment tank provided with an agitator in the manner of a washing machine.

This degradation step is carried out in an aqueous solution containing a polyvalent metal ion or in an acidic aqueous solution having a pH of 2.5 or lower. As a result of using an aqueous solution containing a polyvalent metal ion or acidic aqueous solution having a pH of 2.5 or lower, the superabsorbent polymer in the used sanitary product that has absorbed water and swollen is dehydrated.

Although the superabsorbent polymer is able to absorb a large amount of water as a result of having hydrophilic groups (such as —$COO^-$ groups) and allowing water molecules to bond to the hydrophilic groups by hydrogen bonding, when a superabsorbent polymer that has absorbed water is placed in a solution containing polyvalent metal ions such as calcium ions, the polyvalent metal ions bond to the hydrophilic groups (such as —$COO^-$ groups) (in the form of, for example, —COO—Ca—COO—), hydrogen bonds between the hydrophilic groups and water molecules are cleaved and water molecules are released resulting in dehydration of the superabsorbent polymer, and when a superabsorbent polymer that has absorbed water is placed in acidic aqueous solution having a pH of 2.5 or lower, the negatively charged hydrophilic groups (such as —$COO^-$ groups) are neutralized by the positively charged hydrogen ions ($H^+$) (in the form of, for example, —COOH), thereby weakening the repulsive force of the hydrophilic groups and lowering water absorbency, and these processes are thought to result in dehydration of the superabsorbent polymer.

Pulp fibers and superabsorbent polymer are easily separated by dehydrating the superabsorbent polymer. When a used sanitary product is attempted to be degraded in ordinary water, the superabsorbent polymer absorbs water and swells, and although this causes an increase in solid content concentration in the tank resulting in a decrease in treatment efficiency of the mechanical degradation procedure, this can be avoided by carrying out degradation in an aqueous solution containing polyvalent metal ion or an acidic aqueous solution having a pH of 2.5 or lower.

Examples of polyvalent metal ions that can be used include alkaline earth metal ions and transition metal ions.

Examples of alkaline earth metal ions include beryllium, magnesium, calcium, strontium and barium ions. Preferable examples of aqueous solutions containing alkaline earth metal ions include aqueous solutions of calcium chloride, calcium nitrate, calcium hydroxide, calcium oxide, magnesium chloride and magnesium nitrate, with a calcium chloride aqueous solution being particularly preferable.

Although there are no particular limitations on the transition metal ions provided they are incorporated in a superabsorbent polymer, examples thereof include iron, cobalt, nickel and copper ions. Although examples of aqueous solutions containing transition metal ions include aqueous solutions of an inorganic acid salt, organic acid salt and complex of a transition metal, from the viewpoints of cost and availability, an aqueous solution of an inorganic acid salt or organic acid salt is preferable. Examples of inorganic acid salts include iron salts such as iron chloride, iron sulfate, iron phosphate or iron nitrate, cobalt salts such as cobalt chloride, cobalt sulfate, cobalt phosphate or cobalt nitrate, nickel salts such as nickel chloride or nickel sulfate, and copper salts such as copper chloride or copper sulfate. Examples or organic acid salts include iron lactate, cobalt acetate, cobalt stearate, nickel acetate and copper acetate.

In the case of using an aqueous solution containing transition metal ions, the aqueous solution of a calcium compound is preferable in consideration of safety and price. Among these calcium compounds, a weakly alkaline aqueous solution of calcium chloride having a pH that is as close to neutral as possible is more preferable than strongly alkaline calcium hydroxide or calcium oxide since ozone used in a subsequent step has the characteristic of degrading at alkaline pH. Although there are no particular limitations thereon, the pH of the aqueous solution containing polyvalent metal ions is preferably 11 or lower. In the case of using an alkaline compound, the pH of the aqueous solution is higher than 7 and equal to or lower than 11.

The amount of polyvalent metal ion is preferably 4 millimoles or more, more preferably 4.5 millimoles to 10 millimoles and even more preferably 5 millimoles to 8 millimoles per 1 g (dry weight) of superabsorbent polymer. If the amount of polyvalent metal ion is excessively low, dehydration of the superabsorbent polymer is inadequate. If the amount of polyvalent metal ion is excessively high, excess polyvalent metal ions remain in the treatment solution without being incorporated in the superabsorbent polymer, thereby leading to wasteful use of the polyvalent metal ion and increasing treatment cost.

Although there are no particular limitations on the concentration of polyvalent metal ion in the aqueous solution containing polyvalent metal ion provided it is a concentration that allows the polyvalent metal ion to be incorporated in the superabsorbent polymer, the concentration is preferably 10 millimoles/liter to 1000 millimoles/liter, more preferably 50 millimoles/liter to 700 millimoles/liter, and even more preferably 200 millimoles/liter to 400 millimoles/liter. If the concentration is excessively low, dehydration of the superabsorbent polymer is inadequate. If the concentration is excessively high, excess polyvalent metal ion remains in the treatment solution without being incorporated in the superabsorbent polymer, thereby leading to wasteful use of the polyvalent metal ion and increasing treatment cost.

When an aqueous calcium chloride solution is used for the aqueous solution containing polyvalent metal ion, although the concentration of calcium chloride is preferably 1% by weight or more, since there is no change in effect even if the concentration is 10% by weight or more, the concentration is preferably 1% by weight to 10% by weight and more preferably 3% by weight to 6% by weight.

In the case of using an acidic aqueous solution, the pH of the acidic aqueous solution is 2.5 or lower, preferably 0.5 to 2.5 and more preferably 1.0 to 2.4. If the pH is excessively high, there is the risk of dehydration of the superabsorbent polymer being inadequate. If the pH is excessively low, there is the risk of the recovered pulp fibers being damaged due to the strongly acidic conditions.

Although an aqueous solution of an inorganic acid or organic acid can be used for the acidic aqueous solution having a pH of 2.5 or lower provided the pH thereof is 2.5 or lower, an aqueous solution of an organic acid is somewhat more preferable since it has a higher degree of safety. Although examples of organic acids include tartaric acid, glycolic acid, malic acid, citric acid, succinic acid and acetic acid, citric acid is particularly preferable.

In the case of using an aqueous solution of an organic acid, although there are no particular limitations on the concentration of the organic acid in the aqueous solution provided the pH is 2.5 or lower, the concentration is preferably 0.1% by weight to 10.0% by weight, more preferably 0.5% by weight to 8.0% by weight, and even more preferably 1.0% by weight to 5.0% by weight. If the concentration is excessively low, dehydration of the superabsorbent polymer is inadequate. If the concentration is excessively high, there is the risk of wasteful use of the organic acid.

Although there are no particular limitations on the amount of aqueous solution used in the degradation step provided mechanical force is allowed to act on the used sanitary product, the amount is preferably 3 kg to 50 kg and more preferably 3 kg to 10 kg based on 1 kg of the used sanitary product containing organic waste. If the amount of aqueous solution is excessively low, the used sanitary product cannot be effectively agitated in the aqueous solution. If the amount of aqueous solution is excessively high, polyvalent metal ion or acid is wasted and treatment costs increase.

Although there are no particular limitations on the temperature of the aqueous solution used in the degradation step provided the superabsorbent polymer is dehydrated, the temperature is normally higher than 0° C. and lower than 100° C. Although room temperature is adequate for the temperature of the aqueous solution, the temperature may be raised in order to increase the reaction rate. In the case of heating to raise the temperature, the aqueous solution is preferably heated to room temperature to 60° C., more preferably to room temperature to 40° C., and even more preferably to room temperature to 30° C.

Although there are no particular limitations on the duration of the degradation step provided it is sufficient for degrading the used sanitary product, it is preferably 5 minutes to 60 minutes, more preferably 10 minutes to 50 minutes and even more preferably 20 minutes to 40 minutes.

The method of the present invention also comprises a step for separating pulp fibers from the mixture of pulp fibers and other materials formed in the degradation step (to also be referred to as the "separation step").

In the separation step, pulp fibers are separated from a mixture of pulp fibers and other materials (such as superabsorbent polymer, non-woven fabric, plastic film and rubber) formed as a result of degrading the used sanitary product. In this step, at least a portion of the pulp fibers are separated and recovered. All of the pulp fibers are not required to be recovered. In addition, other materials may be separated and recovered together with the pulp fibers. Although varying according to the separation method, at least a portion of the superabsorbent polymer is mixed in with the separated pulp fibers. For example, in a method used to separate the pulp fibers by screening, in the case of recovering pulp fibers that have passed through the sieve, the majority of the superabsorbent polymer is mixed in with the separated and recovered pulp fibers. In this step, degraded constituent materials are preferably separated into a fraction containing pulp fibers and superabsorbent polymer and a fraction containing non-woven fabric, plastic film and rubber. However, slight amounts of non-woven fabric, plastic film and rubber may also be contained in the fraction containing pulp fibers and superabsorbent polymer, or slight amounts of pulp fibers and superabsorbent polymer maybe contained in the fraction containing non-woven fabric, plastic film and rubber.

Although there are no particular limitations on the method used to separate pulp fibers, examples thereof include a method consisting of precipitating and separating the pulp fibers in water by utilizing differences in specific gravity of the degraded constituent materials, a method consisting of separating the pulp fibers by passing degraded constituent materials of different sizes through a screen having a prescribed mesh size, and a method consisting of separating the pulp fibers using a cyclone centrifugal separator.

The method of the present invention also comprises a step for treating the separated pulp fibers with an ozone-containing aqueous solution having a pH of 2.5 or lower (to be referred to as the "treatment step").

The separated pulp fibers at least have some superabsorbent polymer mixed therein. In this step, the superabsorbent polymer remaining in the separated pulp fibers is removed by degrading the superabsorbent polymer, lowering the molecular weight thereof and solubilizing.

The ozone-containing aqueous solution having a pH of 2.5 or lower used in this step refers to an aqueous solution in which ozone is dissolved therein, and although there are no particular limitations thereon provided the pH is 2.5 or lower, it may be obtained by adding an acid to ozone water to adjust the pH to 2.5 or lower, or may be obtained by blowing ozone into an aqueous solution of an acid having a pH of 2.5 or lower to dissolve the ozone therein. Here, ozone water refers to water in which ozone has been dissolved. Ozone water can be prepared using, for example, an ozone water generator (such as the ED-OWX-2 Ozone Water Exposure Tester manufactured by Ecodesign Inc. or the OS-25V Ozone Generator manufactured by Mitsubishi Electric Corp.).

Although there are no particular limitations on the ozone concentration in the ozone-containing aqueous solution provided it is a concentration that is capable of degrading the superabsorbent polymer, it is preferably 1 ppm by weight to 50 ppm by weight, more preferably 2 ppm by weight to 40 ppm by weight, and even more preferably 3 ppm by weight to 30 ppm by weight. If the concentration is excessively low, the superabsorbent polymer is unable to be completely solubilized, resulting in the risk of the superabsorbent polymer remaining in the recovered pulp fibers. Conversely, if the concentration is excessively high, since oxidizing power also increases, in addition to the risk of causing damage to the pulp fibers, there is also the risk of problems with safety.

There are no particular limitations on the treatment time of the ozone treatment step provided it is an amount of time sufficient for degrading the superabsorbent polymer. Treatment time may be short if the ozone concentration in the ozone-containing aqueous solution is high, or a longer treatment time may be required if the ozone concentration in the ozone-containing aqueous solution is low.

The product of ozone concentration (ppm) in the ozone-containing aqueous solution and treatment time (min) of the ozone treatment step (to be referred to as the "CT value") is preferably 100 ppm·min to 6000 ppm·min, more preferably 200 ppm·min to 4800 ppm·min, and even more preferably 300 ppm·min to 3600 ppm·min. If the CT value is excessively low, the superabsorbent polymer cannot be completely solubilized resulting in the risk of the superabsorbent polymer remaining in the recovered pulp fibers. Conversely, if the CT value is excessively high, there is the risk of damage to the pulp fibers, reduced safety and an increase in manufacturing costs.

Although the treatment time of the ozone treatment step is dependent on the ozone concentration in the ozone-containing aqueous solution as was previously described, it is preferably 5 minutes to 120 minutes, more preferably 10 minutes to 100 minutes, and even more preferably 20 minutes to 80 minutes.

Although there are no particular limitations on the amount of the ozone-containing aqueous solution provided it is an amount sufficient for completely immersing the separated pulp fibers, it is preferably 300 parts by weight to 5000 parts by weight, more preferably 500 parts by weight to 4000 parts by weight and even more preferably 800 parts by weight to 3000 parts by weight based on 100 parts by weight (dry weight) of the separated pulp fibers. If the amount of the ozone-containing aqueous solution is excessively low, the superabsorbent polymer is unable to be completely solubilized, resulting in the superabsorbent polymer remaining in the recovered pulp fibers. Conversely, if the amount of the ozone-containing aqueous solution is excessively high, there is the risk of this leading to an increase in manufacturing costs.

In the ozone treatment step, although there are no particular limitations on the method used to treat the separated pulp fibers with the ozone-containing aqueous solution, and an example thereof consists of placing the ozone-containing aqueous solution in a treatment tank and placing the separated pulp fibers in the ozone-containing aqueous solution. Although it is not essential to agitate the ozone-containing aqueous solution during treatment, a suitable degree of agitation is preferable. In addition, a flow may be generated in the ozone water by blowing ozone gas into an aqueous solution contained in a container to form bubbles of ozone gas. There are no particular limitations on the temperature of the ozone-containing aqueous solution provided the solution is able to degrade the superabsorbent polymer, and the ozone-containing aqueous solution may be heated or left at room temperature.

In the ozone treatment step, the superabsorbent polymer is subjected to the oxidative degradation action of ozone, which causes the three-dimensional network structure of the superabsorbent polymer to collapse resulting in the superabsorbent polymer losing its water retentiveness, decreasing in molecular weight and solubilizing. A superabsorbent polymer having increased fluidity begins to dissolve in the ozone-containing aqueous solution. Moreover, in this step, the pulp fibers are detoxified, bleached and deodorized by the detoxifying action of ozone.

The pH of the ozone-containing aqueous solution is 2.5 or lower. Namely, the ozone treatment step is carried out in an acidic state at a pH or 2.5 or lower. The use of an acidic ozone-containing aqueous solution makes it possible to inhibit water absorption and swelling by the superabsorbent polymer, thereby dramatically improving the degradation and removal effects of the ozone on the superabsorbent polymer, or in other words, making it possible to degrade the superabsorbent polymer in a short period of time. Since the superabsorbent polymer is dehydrated by polyvalent metal ions when an aqueous solution containing polyvalent metal ions is used in the degradation step, although the superabsorbent polymer does not undergo water absorption and swelling even if an acidic ozone-containing aqueous solution is not used, an aqueous solution having a pH of 2.5 or lower is used to dissolve and remove polyvalent metal adhered to the surface of the pulp fibers with acid. On the other hand, when using an acidic aqueous solution having a pH of 2.5 or lower in the degradation step, the reason for using an acidic aqueous solution of pH 2.5 or lower in the ozone treatment step is essentially to inhibit water absorption and swelling of the superabsorbent polymer. In addition, treating with an acidic ozone-containing aqueous solution makes it possible to impart a detoxifying effect attributable to the acid.

The pH of the ozone-containing aqueous solution is preferably 0.5 to 2.5 and more preferably 1.0 to 2.4. If the pH is excessively low, there is the risk of a decrease in the water absorption capacity of the resulting recycled pulp. Although the reason for the decrease in water absorption capacity of the resulting recycled pulp if the pH is excessively low is unclear, it is thought to be due to degeneration of the pulp fibers per se.

The ozone-containing aqueous solution having a pH of 2.5 or lower can be manufactured by adding acid to ozone water.

Although there are no particular limitations on the acid and an inorganic acid or organic acid can be used, an organic acid is preferable. Since organic acid functions in the weakly acidic region and is environmentally friendly, an organic acid is preferable from the viewpoints of safety and burden on the environment. Although there are no particular limitations on the organic acid, examples thereof include tartaric acid, glycolic acid, malic acid, citric acid, succinic acid and acetic acid. Among these, citric acid is preferable.

The pH of the ozone-containing aqueous solution can be adjusted according to the type of acid and amount of acid added. Although there are no particular limitations on the concentration of organic acid in the ozone-containing aqueous solution provided the pH is within the prescribed range, it is preferably 0.1% by weight to 5.0% by weight, more preferably 0.2% by weight to 3.0% by weight, and even more preferably 0.5% by weight to 2.0% by weight.

The ozone treatment step is carried out in acidic state at a pH of 2.5 or lower. When an alkaline calcium compound is used in the degradation step, there are cases in which the alkaline calcium compound remains in the pulp fibers supplied to the ozone treatment step, and when these pulp fibers are added to the ozone-containing aqueous solution, the pH of the ozone-containing aqueous solution may change. In the case the pH of the ozone-containing aqueous solution differs between that prior to addition of the pulp fibers and that after the addition of pulp fibers, the pH of the ozone-containing aqueous solution as referred to here refers to the pH of the ozone-containing aqueous solution after the addition of pulp fibers.

The pH is adjusted by, for example, placing the pulp fibers and ozone-containing aqueous solution in a treatment tank, adding acid thereto while agitating, and discontinuing the addition of acid when the pH of the solution in the treatment tank reaches the prescribed pH.

Citric acid is particularly preferable for the acid used in the ozone treatment step.

When an aqueous solution containing calcium ions is used in the degradation step, calcium ions and various calcium compounds become adhered to the surface of the separated pulp fibers. Since the calcium compounds adhered to the pulp fibers are not necessarily water-soluble and include insoluble and poorly soluble compounds, they cannot be removed by rinsing alone. Since citric acid forms a chelate with calcium resulting in the formation of water-soluble calcium citrate, insoluble or poorly soluble calcium compounds adhered to the surface of the pulp fibers can be effectively dissolved and removed. Since citric acid also forms a chelate with metals other than calcium, in the case insoluble or poorly soluble metal compounds other than calcium compounds are adhered to the surface of the pulp fibers, not only calcium compounds, but also these insoluble or poorly soluble metal compounds other than calcium compounds can also be dissolved and removed. As a result, the ash content of the resulting recycled pulp can be reduced.

The use of citric acid offers the advantages indicated below.

Firstly, since citric acid exhibits acidity, the pH of the recycled pulp can be controlled to a weakly acidic range making it gentle on the skin depending on the manner in which conditions are set, including those of a washing step.

Secondly, since citric acid is not harmful to the body, there is still a high degree of safety even if citric acid remains in the resulting recycled pulp.

Thirdly, since citric acid is mildly and weakly acidic in comparison with acids used in pulp purification, the degree of damage to the resulting recycled pulp can be reduced.

Fourthly, since citric acid can be acquired comparatively inexpensively, it enables recovery and recycling costs to be reduced.

Fifthly, since citric acid is odorless, it does not reduce the quality of the work environment.

Sixthly, the use of citric acid does not require a large equipment investment and can be accommodated using existing equipment.

The method of the present invention may also comprise steps other than the degradation step, separation step and ozone treatment step between the degradation step and separation step, between the separation step and ozone treatment step, or before or after each of these steps. Examples of steps other than the degradation step, separation step and ozone treatment step include washing, dehydration, detoxification and weighing steps.

The method of the present invention preferably further comprises a step for dehydrating the separated pulp fibers between the separation step and the ozone treatment step (to be referred to as the "pulp fiber dehydration step"). There are no particular limitations on the method used to dehydrate the separated pulp fibers, and an example thereof consists of dehydrating the separated pulp fibers with a dehydrator such as a centrifugal separator. Although there are no particular limitations on the dehydration conditions provided the moisture content of the separated pulp fibers can be lowered to a target value, examples thereof consist of dehydration time of preferably 1 minute to 10 minutes, more preferably 2 minutes to 8 minutes and even more preferably 3 minutes to 6 minutes.

The method of the present invention may further comprise a step for washing the recycled pulp as desired after the ozone treatment step (to be referred to as the "recycled pulp washing step").

The method of the present invention may further comprise a step for dehydrating the recycled pulp as desired after the recycled pulp washing step (to be referred to as the "recycled pulp dehydration step").

The recycled pulp washing step and recycled pulp dehydration step may be carried out one time each or may be alternately repeated a plurality of times.

The method of the present invention may further comprise a step for drying the recycled pulp as desired after the recycled pulp dehydration step (to be referred to as the "recycled pulp drying step").

Dried recycled pulp is preferably reused after processing into a shape suitable for sanitary product manufacturing equipment such as in the shape of a sheet, roll or block.

A specific example of the process flow for manufacturing recycled pulp from used sanitary products using the method of the present invention is as indicated below.

(1) Used disposable diapers are weighed (weighing step).

(2) The used disposable diapers and an aqueous calcium chloride solution having a concentration of 5% are placed in a washing machine and the disposable diapers are degraded by agitation and impact generated while washing according to the procedure of an upright washing machine (degradation step).

(3) The degraded disposable diapers are separated into a fraction containing pulp fibers and superabsorbent polymer and a fraction containing non-woven fabric, plastic film and rubber (separation step).

(4) The recovered pulp fibers and superabsorbent polymer are dehydrated (dehydration step).

(5) The dehydrated pulp fibers and superabsorbent polymer are immersed in an aqueous solution of an organic acid (such as citric acid) having a pH of 2.5 or lower (for the purpose of calcium removal and acidification) followed by subjecting to ozone treatment under acidic conditions to as to minimize any loss of activity of the ozone (for the purpose of dissolving the superabsorbent polymer and detoxifying, bleaching and deodorizing the pulp fibers) (ozone treatment step).

(6) The pH is adjusted following dehydration and washing.

(7) Pulp fibers are recovered.

(8) Pulp fibers are dehydrated.

(9) Pulp fibers are dried (secondary detoxification).

In this example, since the aqueous calcium chloride solution is weakly alkaline and the wastewater following treatment is also alkaline, by mixing with the acidic wastewater of ozone treatment, a neutralization reaction occurs thereby making it possible to cause the pH of the wastewater to approach neutrality in order to facilitate treatment.

Another specific example of a process flow for manufacturing recycled pulp from used sanitary products using the method of the present invention is as indicated below.

(1) Used disposable diapers are weighed (weighing step).

(2) The used disposable diapers and an aqueous citric acid solution having a concentration of 10% are placed in a washing machine and the disposable diapers are degraded by agitation and impact generated while washing according to the procedure of an upright washing machine (degradation step).

(3) The degraded disposable diapers are separated into a fraction containing pulp fibers and superabsorbent polymer and a fraction containing non-woven fabric, plastic film and rubber (separation step).

(4) The recovered pulp fibers and superabsorbent polymer are dehydrated (dehydration step).

(5) The dehydrated pulp fibers and superabsorbent polymer are immersed in an aqueous solution of an organic acid (such as citric acid) having a pH of 2.5 or lower (for the purpose of calcium removal and acidification) followed by subjecting to ozone treatment under acidic conditions to as to minimize any loss of activity of the ozone (for the purpose of dissolving the superabsorbent polymer and detoxifying, bleaching and deodorizing the pulp fibers) (ozone treatment step).

(6) The pH is adjusted following dehydration and washing.

(7) Pulp fibers are recovered.

(8) Pulp fibers are dehydrated.

(9) Pulp fibers are dried (secondary detoxification).

In this example, since a calcium compound is not used in the degradation step, the resulting recycled pulp demonstrates favorable quality.

According to the present invention, as a result of separating pulp fibers (including residual superabsorbent polymer) from other materials (including plastic film, non-woven fabric and the like) followed by subjecting the pulp fibers (including residual superabsorbent polymer) to ozone treatment, since the pulp fibers can be treated in a state in which they easily contact ozone after having been washed of organic waste in a state having a low organic substance concentration and in the absence of plastic film and other substances that block ozone gas, they can be treated both efficiently and effectively, thereby shortening treatment time and making it possible to manufacture recycled pulp having a lower ash content than unused pulp.

In addition, since the target of ozone treatment can be limited to a certain degree, it becomes easy to set a reliable sterilization level while also making it possible to prevent the production of harmful substances (such as mutagenic substances) caused by oxidative degradation of ozone.

According to the present invention, pulp having an ash content compatible with sanitary material standards can be efficiently recovered.

Since ozone treatment lowers the molecular weight and solubilizes the superabsorbent polymer, the superabsorbent polymer does not remain between the pulp fibers.

When using citric acid in the ozone treatment step, calcium can be dissolved and removed by utilizing the chelating effect of citric acid, thereby preventing ash derived from superabsorbent polymer deactivated by calcium (calcium crosslinked product) from being detected in the recovered recycled pulp.

Since used sanitary products are dissolved in an aqueous solution containing polyvalent metal ions or an acidic aqueous solution having a pH of 2.5 or lower, there is no loss of fluidity in the treatment tank attributable to the swollen superabsorbent polymer, thereby preventing the occurrence of any decreases in treatment efficiency.

The use of a highly safe organic acid makes it possible to ensure safe treatment.

Recycled pulp obtained according to the method of the present invention is preferably recycled pulp having an ash content of 0.65% by weight or less that can be reused in sanitary napkins. In addition, according to the present invention, since contaminants contained in unused pulp can also be removed by treating with an ozone-containing aqueous solution having a pH of 2.5 or lower, recycled pulp can be obtained that has an ash content lower than that of unused pulp. Recycled pulp obtained according to the method of the present invention preferably has an ash content of 0.11% by weight or less and more preferably 0.05% by weight to 0.11% by weight.

Furthermore, the method used to measure ash content will be subsequently described.

Recycled pulp obtained according to the method of the present invention is preferably used in at least one of an absorbent, tissue and non-woven fabric that compose sanitary products.

EXAMPLES

The ozone water generator, artificial organic waste and physiological saline indicated below were used in the following examples and comparative examples.
[Ozone Water Generator]
Manufacturer: Mitsubishi Electric Corp.
Name: Ozone generator
Model: OS-25V
Ozone water variable concentration range: 1 mg/m$^3$ to 80 mg/m$^3$
Ozone water exposure tank volume: 30 L
[Artificial Organic Waste]
1:1:1 (weight ratio) mixture of equine serum, bovine intestinal mucin and glycerin
[Physiological Saline]
Saline having concentration of 0.9%

Example 1

After immersing a commercially available disposable diaper (Moony Size M, Unicharm Corp.) in 3 L of physiological saline containing 1% artificial organic waste for 10 minutes to adsorb the artificial organic waste thereto, the diaper was immersed for 3 minutes in aqueous calcium chloride solution (pH 10.5) having a concentration of 5% to allow SAP in the diaper to be dehydrated by the crosslinking action of Ca. The diaper was then removed from the aqueous calcium chloride solution, placed in a mesh pouch (measuring 30 cm on all sides, N-No. 250HD manufactured by NBC Meshtec Inc.) and dehydrated for 5 minutes in a dehydration tank to remove excess moisture retained by the pulp, followed by placing in 10 L of an aqueous citric acid solution (pH 2.2) having a concentration of 1% and subjecting to ozone treatment by blowing in ozone gas at 80 mg/m$^3$ (containing 80 mg of ozone in 1 m$^3$, with the remainder consisting of oxygen) for 30 minutes. The amount of dissolved ozone in the treatment water 30 minutes later was 30 ppm and the pH was 2.4. As a result of straining the treated water through a mesh filter having an opening size of 2 mm×2 mm, only pulp was able to be recovered without any SAP present.

When the ash content of the recovered pulp was analyzed according to "5. Ash Content Testing Method" of "2. General Testing Methods" of the Japanese Specifications of Sanitary Napkin Materials, it was determined to have decreased to 0.10% by weight. Furthermore, the ash content of the pulp initially contained in the commercially available disposable diapers used in the examples and comparative examples (to also be referred to as "unused pulp") was 0.18% by weight. As a result of this treatment, it was possible to remove fine residual contaminants inherently contained in the unused pulp and obtain recycled pulp having an ash content lower than that of unused pulp.

Example 2

After immersing a commercially available disposable diaper (Moony Size M, Unicharm Corp.) in 3 L of physiological saline containing 1% artificial organic waste for 10 minutes to adsorb the artificial organic waste thereto, the diaper was immersed for 3 minutes in aqueous citric acid solution (pH 1.6) having a concentration of 10% to allow SAP in the diaper to be dehydrated by the action of the acid. The diaper was then removed from the aqueous citric acid solution, placed in a mesh pouch (measuring 30 cm on all sides, N-No. 250HD manufactured by NBC Meshtec Inc.), and dehydrated for 5 minutes in a dehydration tank to remove excess moisture retained by the pulp, followed by placing in 10 L of an aqueous citric acid solution (pH 2.2) having a concentration of 1% and subjecting to ozone treatment by blowing in ozone gas at 80 mg/m$^3$ for 30 minutes. The amount of dissolved ozone in the treatment water 30 minutes later was 32 ppm and the pH was 2.0. As a result of straining the treated water through a mesh filter having an opening size of 2 mm×2 mm, only pulp was able to be recovered without any SAP present.

When the ash content of the recovered pulp was analyzed in the same manner as Example 1, it was determined to have decreased to 0.06% by weight. As a result of this treatment, it was possible to obtain recycled pulp having an ash content lower than that of unused pulp.

Comparative Example 1

After allowing commercially available disposable diapers (Moony Size M, Unicharm Corp.) to absorb 200 mL of physiological saline, 8 diapers were placed in the washing tub of a twin tub compact washing machine (Seisei AST-01 manufactured by Alumis Co., Ltd.) followed by adding 80 g of calcium oxide (CaO, Wako Pure Chemical Industries, Ltd.) and then adding 6.5 L of aqueous sodium hypochlorite solution having a concentration of 250 ppm (obtained by diluting sodium hypochlorite manufactured by Wako Pure Chemical Industries, Ltd. with tap water). After washing for 15 minutes, the liquid in the washing tub was drained followed by the further addition of 6.5 L of aqueous sodium hypochlorite solution having a concentration of 250 ppm (obtained by diluting sodium hypochlorite manufactured by Wako Pure Chemical Industries, Ltd. with tap water). After washing for 15 minutes, the pulp floating in the liquid in the washing tub was skimmed off and placed in a mesh pouch (measuring 25 cm on all sides, N-No. 250HD manufactured by NBC Meshtec Inc.), and dehydrated for 5 minutes in a dehydration tank. The recovered pulp was rinsed for 15 minutes with tap water while still in the mesh pouch and again dehydrated for 5 minutes in a dehydration tank. The recovered pulp was then dried for 24 hours in a hot air dryer at 105° C. When the ash content of the recovered pulp was analyzed in the same manner as Example 1, it was determined to be extremely high at 8.51% by weight and was incompatible with sanitary material standards.

Comparative Example 2

After immersing a commercially available disposable diaper (Moony Size M, Unicharm Corp.) in 3 L of physiological saline containing 1% artificial organic waste for 10 minutes to adsorb the artificial organic waste thereto, the diaper was immersed in 10 L of aqueous citric acid solution (pH 2.2) having a concentration of 1% followed by subjecting to ozone treatment by blowing in ozone gas at 80 mg/m$^3$ for 30 minutes. The amount of dissolved ozone in the treatment water 30 minutes later was 1 ppm and the pH was 3.0. In this comparative example, since the ozone was consumed by degradation of the artificial organic waste, the amount of dissolved ozone in the treatment water 30 minutes later was lower in comparison with Example 1 and Example 2. As a result of straining the treatment water with a mesh filter having an opening size of 2 mm×2 mm, a large amount of jelly-like SAP remained and it was not possible to recover only recover pulp. When the ash content of the recovered pulp was analyzed in the same manner as Example 1, it was determined to be high at 0.55% by weight. If the CT value of ozone treatment is high, degradation of SAP does not proceed and low-quality pulp ends up being obtained under these conditions. The effects of ozone treatment were determined to be poor unless organic waste is separated and removed prior to ozone treatment.

The results of measuring the ash content, water absorption performance and water retention performance of the recovered pulp in the examples and comparative examples are collectively shown in Table 1.

Furthermore, the methods used to measure water absorption performance and water retention performance are as indicated below.

Incidentally, the ash content of pulp initially contained in the commercially available disposable diapers used in the examples and comparative examples, their water absorption performance and their water retention performance were 0.18% by weight, 16.4 g/g and 7.60 g/g, respectively.

[Ash Content]

Ash content refers to the amount of inorganic or non-combustible residue remaining following asking of organic matter. Ash content is measured in accordance with "5. Ash Content Testing Method" of "2. General Testing Methods" of the Japanese Specifications of Sanitary Napkin Materials. Namely, ash content is measured in the manner indicated below.

After preliminarily intensely heating a platinum, quartz or porcelain crucible to 500° C. to 550° C. for 1 hour and then allowing to cool, the crucible is weighed precisely. 2 g to 4 g of sample are collected and placed in the crucible followed by again precisely weighing the crucible containing the sample, initially subjecting to mild heating after having removed or shifted the position of the cover of the crucible as necessary, and then gradually raising the temperature to intensely heat for 4 hours or more at 500° C. to 550° C. and ash the sample until carbides no longer remained. After allowing to cool, the crucible is weighed precisely. The residue is again asked until it reaches a constant weight and allowed to cool followed by precisely measuring the weight thereof as the amount of ash (%).

[Water Absorption Performance]

Water absorption performance refers to the weight of water absorbed by pulp fibers per unit weight, and is measured in the manner indicated below.

(1) A Nylon net (250 mesh Nylon net manufactured by NBC Meshtec Inc., 200 mm×200 mm) is prepared followed by precisely determining the weight of the net $N_0$ (g).

(2) Approximately 5 g of measurement sample are placed in the Nylon net followed by precisely determining the weight of the sample including the Nylon net pouch $A_0$ (g).

(3) One liter of physiological saline having a concentration of 0.9% is placed in a beaker and the prepared Nylon net pouch containing the sample is immersed therein and allowed to stand for 3 minutes.

(4) The pouch is lifted out of the beaker and allowed to stand undisturbed for 3 minutes on a drainage net to drain off the physiological saline.

(5) The weight A (g) of the Nylon net pouch containing the sample after draining off the physiological saline is measured.

(6) Another Nylon net cut to the same size is prepared, steps (3) and (4) are carried out in the same manner with the exception of not adding a sample, and the weight N (g) of the Nylon net pouch only is measured after draining off the physiological saline.

(7) Water absorption performance (g/g) is then calculated using the equation indicated below.

Water absorption performance=$(A-N-(A_0-N_0))/(A_0-N_0)$ (8) Measurements are carried out 10 times followed by determining the average of the 10 measured values.

[Water Retention Performance]

Water retention performance is measured in the manner indicated below.

The weight B (g) of the sample obtained after measuring water absorption performance is measured after having dehydrated the sample for 90 seconds at 150 G with a centrifugal separator (Model H130 Centrifuge manufactured by Kokusan Co., Ltd., rotating speed of 850 rpm=150 G).

Water retention performance=$(B-N-(A_0-N_0))/(A_0-N_0)$

Measurements are carried out 10 times followed by determining the average of the 10 measured values.

TABLE 1

|  | Ash Content (%) | Water Absorption Performance (g/g) | Water Retention Performance (g/g) |
|---|---|---|---|
| Unused pulp | 0.18 | 16.4 | 7.60 |
| Example 1 | 0.10 | 17.2 | 7.92 |
| Example 2 | 0.06 | 18.1 | 8.30 |
| Comp. Ex. 1 | 8.51 | 8.0 | 2.84 |
| Comp. Ex. 2 | 0.55 | 14.4 | 6.30 |

[Verification of Superabsorbent Polymer Dehydrating Effects of Citric Acid and Calcium Chloride]

After a commercially available disposable diaper (Moony Size M, Unicharm Corp.) was immersed for 10 minutes in 3 L of physiological saline, the diaper was lifted out of the physiological saline followed by immediately weighing the disposable diaper that had absorbed water for use as the post-absorption weight. Next, after having immersed the disposable diaper that had absorbed water for 3 minutes in 3 L of various concentrations (wt %) of aqueous citric acid solution or aqueous calcium chloride solution, the diaper was lifted out of each solution followed immediately by weighing for use as the post-dehydration weight. The value obtained from the equation post-dehydration weight/post-absorption weight×100 (to also be referred to as the "weight ratio") was then calculated. The average values of the results of measuring N=3 times for each concentration are shown in Table 2. Furthermore, Table 2 also indicates the pH values of each concentration of the aqueous citric acid solution or aqueous calcium chloride solution.

TABLE 2

| Solution | Citric Acid | | Calcium Chloride | |
|---|---|---|---|---|
| Concentration | pH | Weight Ratio | pH | Weight Ratio |
| 1% | 2.2 | 90% | 9.5 | 88% |
| 3% | 2.0 | 86% | 10.8 | 82% |
| 5% | 1.8 | 80% | 10.8 | 77% |
| 7% | 1.5 | 75% | 11.0 | 77% |
| 10% | 1.3 | 72% | 11.0 | 76% |

When SAP that has absorbed excrement additionally absorbs water and swells in a treatment tank, since the volume thereof becomes excessively large making treatment difficult, it is important that the weight ratio at least be greater than 100%, and since treatment becomes easier as volume decreases, treatment efficiency increases. Accordingly, the weight ratio is preferably 100% or less, more preferably 90% or less and even more preferably 80% or less.

[Verification of Change in Ozone Treatment Efficiency Attributable to Artificial Organic Waste]

29 g of superabsorbent polymer and 100 g of artificial organic waste were added to 10 L of treatment water (1% aqueous citric acid solution) followed by treating by blowing in ozone gas at 80 mg/m$^3$ for 30 minutes. The amount of dissolved ozone in the treatment water 30 minutes later was 1.2 ppm and the superabsorbent polymer degradation rate was 36%.

When treatment was carried out in the same manner without adding artificial organic waste, the amount of dissolved ozone in the treatment water 30 minutes later was 25 ppm and the superabsorbent polymer degradation rate was 99%.

In the case of having added artificial organic waste as a model of human waste to treatment water, in addition to the dissolved ozone concentration in the treatment solution decreasing in comparison with the absence of organic waste, degradation of superabsorbent polymer was also confirmed to decrease. This is because, since a large amount of ozone is consumed by degradation of the organic waste, degradation of the superabsorbent polymer proceeds with difficulty.

In the present invention, treatment is able to be carried out efficiently by washing and degrading used sanitary products in a solution in which a superabsorbent polymer does not absorb water or swell resulting in a mixture mainly composed of pulp and residual superabsorbent polymer, followed by treating the mixture with ozone.

INDUSTRIAL APPLICABILITY

Recycled pulp manufactured according to the method of the present invention is able to be preferably reused in the manufacturing of sanitary products.

The invention claimed is:

1. A method of processing a used sanitary product, the method comprising:
   degrading a used sanitary product in an acid solution having a pH of 1.0 to 2.5 or less, wherein the used sanitary product includes pulp fibers and a superabsorbent polymer;
   applying a mechanical force to the used sanitary product during the degrading;
   separating pulp fibers and pulp fibers in which superabsorbent polymers remain from the mixture formed in the degrading step to obtain separated pulp fibers; and
   treating the separated pulp fibers in an ozone-containing solution.

2. The method of claim 1, wherein the acid solution comprises an organic acid.

3. The method of claim 2, wherein the organic acid is selected from the group consisting of tartaric acid, glycolic acid, malic acid, citric acid, succinic acid and acetic acid.

4. The method of claim 2, wherein the organic acid is citric acid.

5. The method of claim 1, wherein the ozone-containing solution comprises an acid.

6. The method of claim 1, wherein the used sanitary product includes organic waste.

7. A method of making a sanitary product, the method comprising:
   degrading a used sanitary product in an acid solution having a pH of 2.5 or less, wherein the used sanitary product includes pulp fibers and a superabsorbent polymer;
   applying a mechanical force to the used sanitary product during the degrading;
   separating pulp fibers and pulp fibers in which superabsorbent polymers remain from the mixture formed in the degrading step to obtain separated pulp fibers; and
   treating the separated pulp fibers in an ozone-containing solution.

8. The method of claim 7, wherein the acid solution comprises an organic acid.

9. The method of claim 7, further comprising incorporating the treated pulp fibers into the sanitary product.

10. The method of claim 9, wherein incorporating the treated pulp fibers into the sanitary product comprises incorporating the treated pulp fibers into at least one of a disposable diaper, an incontinence pad, a urine collection pad, a sanitary napkin or a panty liner.

11. The method of claim 7, wherein treating the separated pulp fibers comprises producing treated pulp fibers having an ash content of 0.65% by weight or less.

12. The method of claim 7, wherein the used sanitary product includes organic waste.

13. A method of extracting pulp fibers, the method comprising:
   degrading the used sanitary product in an acid solution having a pH of 2.5 or less, wherein the used sanitary product includes the pulp fibers and a superabsorbent polymer; and
   applying a mechanical force to the used sanitary product during the degrading;
   separating pulp fibers and pulp fibers in which superabsorbent polymers remain from the mixture formed in the degrading step to obtain separated pulp fibers; and
   treating the separated pulp fibers in an ozone-containing solution.

14. The method of claim 13, wherein the acid solution comprises an organic acid.

\* \* \* \* \*